(12) United States Patent
Gurol et al.

(10) Patent No.: US 8,113,310 B2
(45) Date of Patent: Feb. 14, 2012

(54) LINEAR MOTOR CHARGED ELECTRIC VEHICLE

(75) Inventors: Husam Gurol, Carlsbad, CA (US);
Philip L. Jeter, San Diego, CA (US);
Kurt M. Schaubel, Encinitas, CA (US)

(73) Assignee: General Atomics, San Diego, CA (US)

( * ) Notice: Subject to any disclaimer, the term of this patent is extended or adjusted under 35 U.S.C. 154(b) by 430 days.

(21) Appl. No.: 12/370,172

(22) Filed: Feb. 12, 2009

(65) Prior Publication Data
US 2010/0200316 A1 Aug. 12, 2010

(51) Int. Cl.
*B60K 1/00* (2006.01)
(52) U.S. Cl. .................................. 180/65.31; 104/283
(58) Field of Classification Search ............... 180/65.1, 180/65.21, 65.22, 65.27, 65.285, 65.31, 65.6, 180/65.7, 54.1, 60; 104/283, 284
See application file for complete search history.

(56) References Cited

U.S. PATENT DOCUMENTS

| | | | | |
|---|---|---|---|---|
| 874,411 A * | 12/1907 | Leblano | ........................ | 307/9.1 |
| 3,223,897 A | 12/1965 | Sullivan | | |
| 3,594,622 A * | 7/1971 | Inagaki | ........................ | 318/687 |
| 3,827,371 A * | 8/1974 | Onoda | ........................ | 104/292 |
| 3,914,562 A * | 10/1975 | Bolger | ........................ | 191/10 |
| 3,924,211 A | 12/1975 | Ioffe et al. | | |
| 4,011,478 A * | 3/1977 | Reenstra | ........................ | 310/155 |
| 4,061,089 A | 12/1977 | Sawyer | | |
| 4,205,243 A * | 5/1980 | Lingaya | ........................ | 310/13 |
| 4,331,225 A | 5/1982 | Bolger | | |
| 4,459,438 A * | 7/1984 | Kaiser | ........................ | 191/10 |
| 4,498,023 A | 2/1985 | Stout | | |
| 4,781,286 A * | 11/1988 | Weaver | ........................ | 198/789 |
| 4,825,111 A * | 4/1989 | Hommes et al. | ........... | 310/12.15 |
| 5,174,215 A * | 12/1992 | Barrows | ........................ | 104/288 |
| 5,175,456 A | 12/1992 | Neff et al. | | |
| 5,253,592 A | 10/1993 | Coffey | | |
| 5,317,976 A * | 6/1994 | Aruga et al. | .................. | 104/282 |
| 5,323,133 A | 6/1994 | Heath et al. | | |
| 5,431,109 A | 7/1995 | Berdut | | |
| 5,473,233 A * | 12/1995 | Stull et al. | ...................... | 318/587 |
| 5,573,090 A * | 11/1996 | Ross | ............................... | 191/10 |
| 5,595,271 A * | 1/1997 | Tseng | ............................... | 191/4 |
| 5,628,252 A | 5/1997 | Kuznetsov | | |
| 5,649,489 A | 7/1997 | Powell et al. | | |
| 5,677,605 A * | 10/1997 | Cambier et al. | ......... | 318/400.14 |
| 5,722,326 A | 3/1998 | Post | | |
| 5,809,897 A | 9/1998 | Powell et al. | | |
| 5,905,351 A * | 5/1999 | Morishita et al. | ............. | 318/606 |
| 6,044,770 A | 4/2000 | Davey et al. | | |
| 6,085,663 A | 7/2000 | Powell et al. | | |
| 6,127,791 A * | 10/2000 | Strunk | ........................ | 318/252 |
| 6,129,025 A | 10/2000 | Minakami et al. | | |
| 6,209,672 B1 | 4/2001 | Severinsky | | |
| 6,229,722 B1 * | 5/2001 | Ichikawa et al. | ................ | 363/71 |

(Continued)

*Primary Examiner* — J. Allen Shriver, II
*Assistant Examiner* — Brodie Follman
(74) *Attorney, Agent, or Firm* — Nydegger & Associates

(57) ABSTRACT

An all-electric, wheeled vehicle has a magnet array that can be selectively moved between a retracted position and a deployed position, to respectively operate in a motor mode or a generator mode. When in the motor mode, with its magnet array retracted, wheel rotation to move the vehicle is powered by an onboard battery. Alternately, in the generator mode with the magnet array deployed, the vehicle is powered by a Linear Synchronous Motor (LSM). Specifically, the deployed magnet array interacts with a multiple-phase winding (i.e. LSM) embedded into the roadway on which the vehicle travels. Further, rotation of the wheel during vehicle movement in the generator mode recharges the battery.

13 Claims, 2 Drawing Sheets

U.S. PATENT DOCUMENTS

| | | | |
|---|---|---|---|
| 6,523,650 B1 * | 2/2003 | Pribonic et al. | 188/165 |
| 6,651,566 B2 * | 11/2003 | Stephan et al. | 104/288 |
| 6,727,629 B1 * | 4/2004 | Soghomonian et al. | 310/254.1 |
| 6,777,851 B2 * | 8/2004 | Maslov | 310/254.1 |
| 6,827,022 B2 | 12/2004 | van del Bergh et al. | |
| 6,899,036 B2 * | 5/2005 | Lamb et al. | 104/290 |
| 7,204,192 B2 * | 4/2007 | Lamb et al. | 104/282 |
| 7,895,951 B1 * | 3/2011 | McGrath, Jr. | 104/292 |
| 7,950,333 B2 * | 5/2011 | Crawford et al. | 104/283 |
| 2004/0035315 A1 | 2/2004 | Richards | |
| 2004/0061989 A1 * | 4/2004 | Beihoff et al. | 361/103 |
| 2004/0070286 A1 * | 4/2004 | Marzano | 310/12 |
| 2006/0092611 A1 * | 5/2006 | Beihoff et al. | 361/698 |
| 2007/0164698 A1 * | 7/2007 | Bieler et al. | 318/717 |
| 2009/0073807 A1 * | 3/2009 | Sitton et al. | 367/38 |
| 2009/0114114 A1 * | 5/2009 | Rose et al. | 104/53 |
| 2009/0229487 A1 * | 9/2009 | Crawford et al. | 104/281 |
| 2010/0236445 A1 * | 9/2010 | King et al. | 104/130.03 |

* cited by examiner

LINEAR MOTOR CHARGED ELECTRIC VEHICLE

FIELD OF THE INVENTION

The present invention pertains generally to all-electric vehicles. More particularly, the present invention pertains to electric vehicles that are alternately propelled by a battery or a Linear Synchronous Motor (LSM). The present invention is particularly, but not exclusively, useful as an electric vehicle that recharges its battery while being propelled by the LSM.

BACKGROUND OF THE INVENTION

It is well known that electric motors and generators can be respectively used to convert electrical energy into mechanical energy and mechanical energy into electrical energy. Basically, both a motor and a generator operate on related physical principles. They both also involve similar operational structures, namely: a conductor, a magnetic field and an electrical current. On the one hand, for a motor (conversion of electrical to mechanical energy) a conductor is located in a magnetic field and an electrical current is passed through the conductor. Consequently, the magnetic field will exert a force on the conductor. This force can then be mechanically transferred from the conductor to do work (e.g. rotate a wheel on a vehicle). On the other hand, for a generator (conversion of mechanical energy into electrical energy) a conductor is physically moved in a magnetic field. The consequence of this movement is that an electrical current is set up or induced in the conductor. This induced current can then be stored (e.g. recharging a battery).

A Linear Synchronous Motor (LSM) is a particular type of electrical motor wherein the conductor (e.g. a three-phase winding) is laid out in a substantially linear configuration. The magnetic field is then moved along a path substantially parallel to the layout of the conductor (winding). The resultant force can then be applied to move a vehicle in a direction along the conductor (winding).

In its configuration, an LSM is noticeably different from the more conventional electric motors that have interactive magnetic fields and conductors. Typically, but not necessarily, the magnetic field in a conventional arrangement is held stationary while the conductor is rotated in the magnetic field. Despite their obvious configuration differences, in all other important aspects the basic physics of an LSM and a conventional electric motor are essentially the same.

For many applications, and for many different reasons, an electrical power plant (i.e. an electric motor) may be preferable to other types of motors (e.g. a fossil fuel combustion engine). In particular, more and more land vehicles are being equipped with electrical power plants. For example, many automobile manufacturers are providing battery-powered cars. LSMs are also being increasingly considered for use as the propulsion units of trains traveling over extended sections of railway lines. An important consideration for the use of an LSM as a propulsion unit for a vehicle, however, is that it effectively confines travel of the vehicle to the roadways where a stationary component of the LSM (e.g. the conductor/winding) has been pre-positioned. In some applications, however, it may be desirable to avoid such a limitation in favor of a more flexible travel envelope. If so, energy consumption requirements can become a concern.

In light of the above, it is an object of the present invention to provide an all-electric vehicle that is alternately propelled by two different types of propulsion units (i.e. an LSM and a battery-powered electric motor). Another object of the present invention is to provide an all-electric vehicle that includes controls for selectively operating a motor/generator either as a battery-powered motor to propel the vehicle, or as a generator for recharging the battery while the vehicle is being propelled by an LSM. Still another object of the present invention is to provide an all-electric vehicle that is easy to use, relatively simple to manufacture and comparatively cost effective.

SUMMARY OF THE INVENTION

An all-electric wheeled vehicle in accordance with the present invention is alternately propelled by either of two electric propulsion units. One unit includes an onboard, battery-powered electric motor/generator. The other unit is a Linear Synchronous Motor (LSM) that includes both onboard and external components. In either case, the wheels of the vehicle remain in contact with the roadway on which the vehicle is traveling.

As intended for the present invention, and depending on which propulsion unit is being used, the motor/generator can be operated in either of two modes (i.e. a motor mode or a generator mode). In the motor mode, the vehicle uses the motor/generator as its propulsion unit with electrical energy from the battery to rotate the wheels of the vehicle for propulsion. Preferably, the motor is a synchronous permanent magnet motor capable of generating around 125 hp at approximately 1200 rpm. Alternately, when the vehicle is being propelled by the LSM, the motor/generator can be operated in its generator mode. In this mode, the rotating wheels of the vehicle interact with the motor/generator to recharge the battery.

To establish the LSM, the vehicle has an onboard magnet array that can be selectively deployed. When deployed, the magnet array is positioned adjacent the roadway over which the vehicle is traveling, with an air gap of approximately 5 cm therebetween. This then allows the magnetic field of the magnet to interact with an external electric power segment that is embedded into the roadway. For the operation of the LSM, the power segment for the LSM preferably includes a three-phase winding with an electric current provided by an external power source that passes through the winding. At this point, it is noted that the three-phase winding is only exemplary. As will be appreciated by the skilled artisan, different multiple-phase windings can be used, if desired.

Structurally, the electric motor/generator, the battery (e.g. ultra-capacitors) and a system control for alternately operating the motor/generator in either the motor mode or the generator mode are all mounted on the vehicle's undercarriage. Further, as implied above, the vehicle is also equipped with a magnet array that is mounted on the undercarriage for movement between a retracted configuration and a deployed configuration. For the present invention, when the magnet array is in its retracted configuration, the vehicle is operated in the motor mode as disclosed above. On the other hand, when the magnet array is deployed, the LSM acts as the propulsion unit for the vehicle and the motor generator recharges the battery.

In more detail, the magnet array preferably includes a permanent magnet that is mounted on a support member. Further, the support member is preferably a back iron and the permanent magnet is a Halbach array. Importantly, the Halbach array (permanent magnet) is provided to establish a magnetic field that will interact with the current in the three-phase winding of the power segment. Preferably, the LSM operates at approximately 15 Hz and the winding creates an LSM field having a waveform speed along the power segment of approximately 15 mph. As will be appreciated by the skilled artisan, LSM operation at 15 Hz and a waveform speed of 15 mph are exemplary. Correspondingly different LSM frequencies and waveform speeds can be used, if desired. Further, the power train of the vehicle includes a differential that is connected between the wheel and the electric motor, with the differential having an approximately 10.9 to 1 gear ratio. Additionally, a variable frequency inverter-rectifier is connected between the electric motor and the battery for charging the battery with a d.c. voltage when the motor/generator is operated in the generator mode, and for providing an a.c. voltage to energize the electric motor when it is operated in the motor mode.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
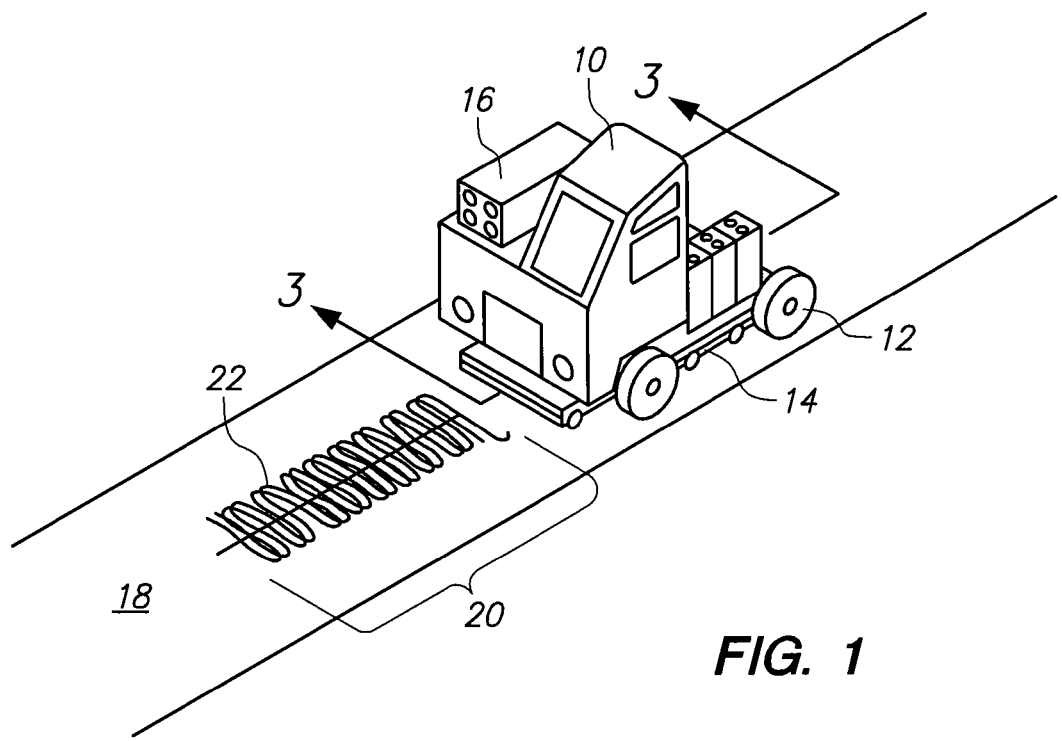
FIG. 1 is a perspective view of an all-electric vehicle in accordance with the present invention, with the vehicle shown traveling toward a power segment embedded into the roadway on which the vehicle is traveling.

Referring initially to FIG. 1 an all-electric vehicle in accordance with the present invention is shown and is designated 10. As shown, the vehicle 10 is a wheeled vehicle that will typically have a plurality of wheels but must necessarily have at least one wheel 12. As will be appreciated by the skilled artisan, the vehicle 10 can essentially be any kind of wheeled land vehicle known in the pertinent art. The vehicle (tractor) 10 shown in the drawings is only exemplary. FIG. 1 also indicates that a magnet array 14 is mounted on the vehicle 10 substantially as shown, and that the vehicle 10 carries at least one battery 16. For purposes of the present invention, the battery 16 preferably includes ultra-capacitors having an electrical energy capability of about eight mega-joules. Note: as a practical matter there may be a plurality of batteries 16 carried on the vehicle 10. FIG. 1 also shows that for at least a portion of its travel time, the vehicle 10 is expected to travel along a roadway 18 that includes a power segment 20 which is preferably embedded into the roadway 18. More specifically, the power segment 20 comprises a three-phase winding 22 that receives an electrical current from an external power source (not shown).

Figure 2:
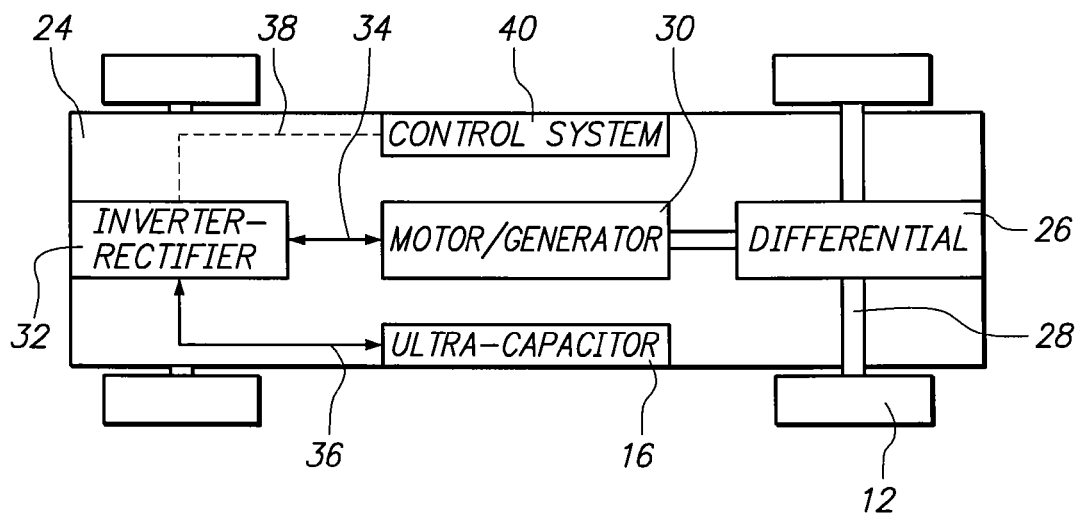
FIG. 2 is a block diagram of the electrical system employed by the present invention for the all-electric vehicle.

Referring now to FIG. 2, a schematic block diagram of components for the vehicle 10 is shown with the components arranged on an undercarriage 24 of the vehicle 10. In this arrangement, a wheel 12 of the vehicle 10 is connected to a differential 26 via an axle 28. In turn, the differential 26 is connected directly to a motor/generator 30. For purposes of the present invention, the differential 26 preferably has around a 10.9 to 1 gear ratio, and the motor/generator 30 preferably incorporates a permanent magnet motor that operates with approximately 1445 rpm at 15 mph. FIG. 2 also shows that the motor/generator 30 is connected to an inverter-rectifier 32 via an a.c. line 34, and that the battery (ultra-capacitor) 16 is connected to the inverter-rectifier 32 via a d.c. line 36. Further, FIG. 2 indicates by the dashed-line 38 that a control system 40 onboard the vehicle 10 can be used to alternate the operation of the inverter-rectifier 32 and thereby cause the motor/generator 30 to operate in either a motor mode or a generator mode.

To operate the motor/generator 30 in its motor mode, the control system 40 is used to direct the inverter-rectifier 32 to convert a d.c. voltage from the battery 16 into an a.c. voltage for operating the motor/generator 30 as a motor. Accordingly, the motor/generator 30 provides power to rotate the wheel 12. Thus, the motor/generator 30 acts as a propulsion unit for the vehicle 10 when the motor/generator 30 is operated in its motor mode. Alternately, for the motor/generator 30 to operate in its generator mode, the inverter-rectifier 32 is controlled by the control system 40 to convert an a.c. voltage from the motor/generator 30 into a d.c. voltage for recharging the battery 16. In this generator mode, a rotation of the wheel 12 causes the motor/generator 30 to generate the a.c. voltage that is converted by the inverter-rectifier 32 into the d.c. voltage that recharges the battery 16.

As noted above, the vehicle 10 alternately uses two different propulsion units. One propulsion unit is established when the motor/generator 30 is operated in its motor mode as disclosed above. The other propulsion unit is a Linear Synchronous Motor (LSM). Thus, an important aspect of the present invention concerns how a Linear Synchronous Motor (LSM) is established as a propulsion unit for the vehicle 10. How this is accomplished is best appreciated with reference to FIGS. 3A and 3B.

Figure 3A:
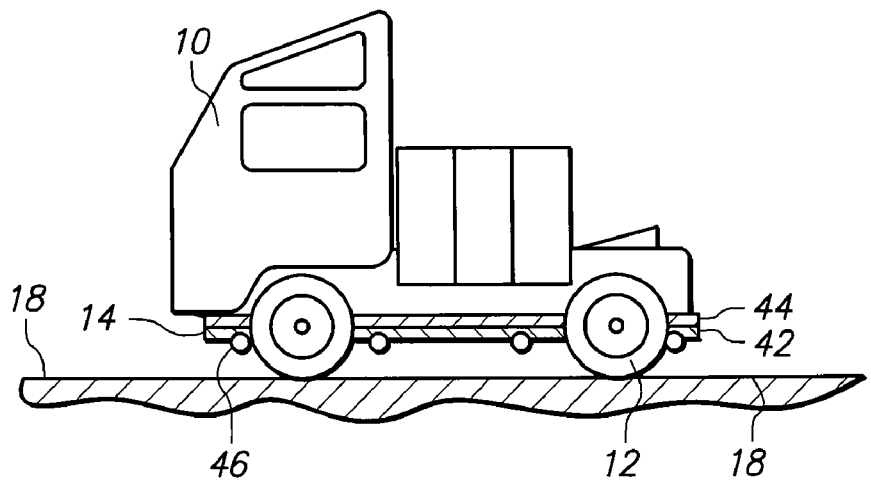
FIG. 3A is a side elevation view of the all-electric vehicle with its magnet array in a retracted configuration, with the magnet array shown in cross section as seen along the line 3-3 in FIG. 1.
Figure 3B:
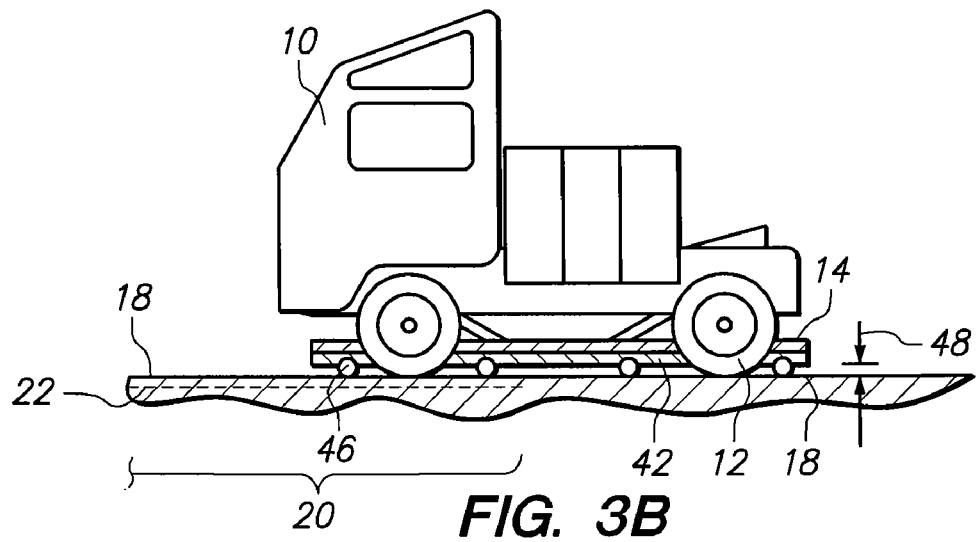
FIG. 3B is a view of the vehicle as seen in FIG. 3A with the magnet array in a deployed configuration.
Figure 4:
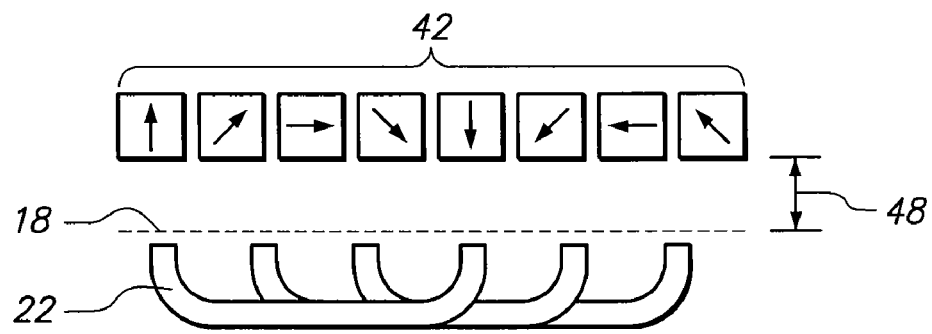
FIG. 4 is a representative cross section view of a portion of the magnet array and a portion of the power segment as seen along the line 3-3 in FIG. 1.

In FIG. 3A, the magnet array 14 is shown in a retracted configuration wherein the magnet array 14 is effectively distanced from the roadway 18. FIG. 3A also shows that the magnet array 14 includes a permanent magnet 42 that is mounted on a support member 44 that can act as a back iron for the permanent magnet 42. Additionally, it is seen that the magnet array 14 includes a plurality of vertical clearance wheels, of which the vertical clearance wheel 46 is exemplary. In FIG. 3B, the magnet array 14 is shown in a deployed configuration wherein the magnet array 14 is deployed (i.e. lowered) toward the roadway 18 until the vertical clearance wheel(s) 46 makes contact with the roadway 18. With this contact, the permanent magnet 42 of the magnet array 14 is at a distance 48 from the surface of the roadway 18. Preferably, the distance 48 is approximately five centimeters. For purposes of the present invention, the permanent magnet 42 can be any type magnet well known in the pertinent art, such as a Halbach Array shown in FIG. 4. In any event, as indicated in FIG. 4, when the magnet array 14 has been deployed it is close enough to the three-phase winding 22 for the magnetic field of the permanent magnet 42 to directly interact with the electric field of the three-phase winding 22. This interaction then provides a propulsive force for the vehicle 10. In this arrangement for the LSM, the three-phase winding 22 is preferably operated at about fifteen Hz, to create a waveform speed (i.e. a speed for vehicle 10) of about fifteen mph.

In its operation, the vehicle 10 can travel along the roadway 18 by selectively using either of two propulsion units. The selection, however, is dependent on whether the vehicle 10 is traveling over an embedded power segment 20. Specifically, when the vehicle 10 is traveling over a power segment 20, an LSM propulsion unit can be created between the magnet array 14 on the vehicle 10 and the three-phase winding 22 embedded in the roadway 18. This is done be lowering the magnet array 14 into a deployed configuration (see FIG. 3B) as the vehicle 10 approaches the power segment 20. An engagement of the magnetic field of the magnet array 14 with the electric waveform of the three-phase winding 22 is accomplished by having the speed of the vehicle 10 substantially correspond with the speed of the waveform (e.g. 15 mph). Once established, the LSM can thereafter effectively function as the propulsion unit of the vehicle 10.

Importantly, for purposes of the present invention, as the vehicle 10 is being propelled over a power segment 20 in the roadway 18 by the LSM, the battery 16 can be recharged. Specifically, as the vehicle 10 moves along the roadway 18 under the influence of the LSM, the wheel 12 is rotated by its contact with the roadway 18. This rotation of the wheel 12 is then used to generate an a.c. voltage with the motor/generator 30 (i.e. the motor/generator 30 is in its generator mode). The a.c. voltage is then converted to a d.c. voltage by the inverter-rectifier 32 for use in recharging the battery 16.

When the vehicle 10 is not traveling over a power segment 20, and therefore can no longer establish an LSM with its magnet array 14, the magnet array 14 is raised to its retracted configuration (see FIG. 3A). In this case, the vehicle 10 operates with an electric motor as its other propulsion unit. Specifically, with the motor/generator 30 now directed by the control system 40 to operate in the motor mode, electrical power from the battery 16 is passed through the inverter-rectifier 32 and to the motor/generator 30 to run the motor/generator 30 as a motor (i.e. the motor/generator 30 is in its motor mode). Thus, the motor/generator 30 functions as a propulsion unit to rotate the wheel 12 for propulsion of the vehicle 10.

While the particular Linear Motor Charged Electric Vehicle as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An all-electric vehicle for movement along a roadway, wherein the roadway has at least one power segment with a three-phase winding imbedded therein, the vehicle comprising:
    an undercarriage having at least one wheel, wherein the wheel is in contact with the roadway for rotation thereof during movement of the vehicle along the roadway;
    an electric motor mounted on the undercarriage;
    a battery mounted on the undercarriage for running the electric motor;
    a magnet array mounted on the undercarriage for movement between a retracted configuration and a deployed configuration;
    an electrical system mounted on the undercarriage for alternately operating in a motor mode to move the vehicle along the roadway with power from the electric motor, and in a generator mode to recharge the battery by rotating the wheel, wherein the electrical system has a differential connected between the wheel and the electric motor, with the differential having an approximately 10.9 to 1 gear ratio, wherein the electric motor is a synchronous permanent magnet motor for generating 125 hp at approximately 1200 rpm, and wherein the electrical system has a variable frequency inverter-rectifier connected between the electric motor and the battery for charging the battery with a d.c. voltage when the electrical system is operated in the generator mode, and for providing an a.c. voltage to energize the electric motor when the electrical system is operated in the motor mode; and
    a control system for operating the vehicle in the generator mode, to recharge the battery, by selectively moving the magnet array into its deployed configuration to establish a Linear Synchronous Motor (LSM) between the magnet array and the three-phase winding in the power segment of the roadway for moving the vehicle along the roadway.

2. A vehicle as recited in claim 1 wherein the magnet array comprises:
    a support member; and
    a permanent magnet mounted on the support member.

3. A vehicle as recited in claim 2 wherein the support member is a back iron and the permanent magnet is a Halbach array.

4. A vehicle as recited in claim 1 wherein the three-phase winding in the power segment creates an LSM field having a waveform speed along the power segment of approximately 15 mph.

5. A vehicle as recited in claim 4 wherein the LSM operates at approximately 15 Hz.

6. A vehicle as recited in claim 1 wherein the magnet array in its deployed configuration is positioned at a distance of approximately 5 cm from the three-phase winding in the power segment.

7. A dual-mode power unit for moving a wheeled vehicle which comprises:
    a generator assembly mounted on the vehicle to operate in a generator mode for charging a battery by rotating a wheel of the vehicle, wherein the wheel rotates as the vehicle moves in response to a Linear Synchronous Motor (LSM), and wherein the LSM is established by an interaction of a magnet array on the vehicle with a three-phase winding positioned external to the vehicle;
    a motor assembly mounted on the vehicle to operate in a motor mode for rotating the wheel to move the vehicle with an electric motor powered by the battery;
    a control system mounted on the vehicle for alternately activating the generator mode and the motor mode; and
    a power train, wherein the power train has a differential connected between the wheel and the electric motor, with the differential having an approximately 10.9 to 1 gear ratio, and wherein the power train has a variable frequency inverter-rectifier connected between the electric motor and the battery for charging the battery with a d.c. voltage when the power unit is operated in the generator mode, and for providing an a.c. voltage to energize the electric motor when the power unit is operated in the motor mode.

8. A power unit as recited in claim 7 further comprising a magnet array connected to the control system for selective movement of the magnet array into a deployed configuration to establish a Linear Synchronous Motor (LSM) between the magnet array and a three-phase winding in a power segment of a roadway, as the vehicle moves along the roadway.

9. A power unit as recited in claim 8 wherein the magnet array comprises:
    a support member; and
    a permanent magnet mounted on the support member.

10. A power unit as recited in claim 9 wherein the support member is a back iron and the permanent magnet is a Halbach array.

11. A power unit as recited in claim 8 wherein the three-phase winding in the power segment creates an LSM field having a waveform speed along the power segment of approximately 15 mph, and further wherein the LSM operates at approximately 15 Hz.

12. A power unit as recited in claim 8 wherein the magnet array in its deployed configuration is positioned at a distance of approximately 5 cm from the three-phase winding in the power segment.

13. A method for moving an all-electric wheeled vehicle having at least one wheel along a roadway, wherein the roadway has at least one power segment with a three-phase winding imbedded therein, wherein the three-phase winding in the power segment creates an LSM field having a waveform speed along the power segment of approximately 15 mph, wherein the vehicle has a battery powered electric motor mounted on an undercarriage and includes a magnet array with a support member and a permanent magnet attached thereon, wherein the support member is a back iron, and wherein the magnet array is a Halbach array mounted on the undercarriage for movement of the magnet array between a retracted configuration and a deployed configuration, and further wherein the method comprises the steps of:

operating the vehicle in a motor mode to rotate the wheel with power from the electric motor for movement of the vehicle along the roadway;

selectively moving the magnet array into its deployed configuration to establish a Linear Synchronous Motor (LSM) between the magnet array and the three-phase winding in the power segment of the roadway for moving the vehicle along the roadway in a generator mode, wherein the wheel rotates to recharge the battery when operated in the generator mode;

operating the LSM at approximately 15 Hz;

connecting a differential between the wheel and the electric motor, with the differential having an approximately 10.9 to 1 gear ratio to generate 125 hp at approximately 1200 rpm; and connecting a variable frequency inverter-rectifier between the electric motor and the battery for charging the battery with a d.c. voltage when the electrical system is operated in the generator mode, and for providing an a.c. voltage to energize the electric motor when the electrical system is operated in the motor mode.

* * * * *